US006800307B1

(12) United States Patent
Matthews et al.

(10) Patent No.: US 6,800,307 B1
(45) Date of Patent: Oct. 5, 2004

(54) COOKED SAUSAGE AND METHOD FOR MAKING THE SAME

(75) Inventors: Bernard Trevor Matthews, Norfolk (GB); David John Joll, Norfolk (GB); Werner Koppers, Wiefelstede (DE); Friedrich Buse, Oldenburg (DE)

(73) Assignee: Bernard Matthews PLC, Norfolk (GB)

( * ) Notice: Subject to any disclaimer, the term of this patent is extended or adjusted under 35 U.S.C. 154(b) by 0 days.

(21) Appl. No.: 09/557,418

(22) Filed: Apr. 21, 2000

Related U.S. Application Data

(63) Continuation-in-part of application No. PCT/GB98/02999, filed on Oct. 7, 1998.

(30) Foreign Application Priority Data

Oct. 24, 1997 (DE) ......................................... 197 47 197
Aug. 13, 1999 (DE) ......................................... 199 38 434

(51) Int. Cl.$^7$ ......................... A23L 1/314; A23L 1/315; A23L 1/317

(52) U.S. Cl. ............................. 426/38; 426/41; 426/43; 426/59; 426/105; 426/412; 426/413; 426/646

(58) Field of Search .............................. 426/38, 41, 43, 426/59, 105, 412, 413, 646

(56) References Cited

U.S. PATENT DOCUMENTS

| | | | | |
|---|---|---|---|---|
| 4,362,750 A | * | 12/1982 | Swartz ......................... | 426/59 |
| 4,492,712 A | | 1/1985 | Casella ........................ | 426/59 |
| 4,504,515 A | | 3/1985 | Hohenester et al. ......... | 426/641 |
| 5,004,618 A | | 4/1991 | Buckholz, Jr. et al. ...... | 426/281 |
| 5,039,543 A | | 8/1991 | Lee et al. .................... | 426/533 |
| 5,106,643 A | | 4/1992 | Laufer ......................... | 426/565 |
| 5,538,743 A | | 7/1996 | Heinemann et al. .......... | 426/42 |
| 5,840,884 A | | 11/1998 | Lis et al. .................... | 536/127 |

FOREIGN PATENT DOCUMENTS

| | | |
|---|---|---|
| DE | 1692573 | 9/1966 |
| DE | 2127202 | 12/1972 |
| DE | 215 2655 A | 4/1973 |
| DE | 2 203 582 | 8/1973 |
| DE | 195 19 851 A1 | 12/1996 |
| DE | 195 19 851 | 12/1996 |
| DE | 197 52 249 | 4/1999 |
| DE | 198 26 978.1 | 4/1999 |
| EP | 0 024 790 A1 | 3/1981 |
| EP | 0 029 503 A1 | 6/1981 |
| EP | 0 061 914 B1 | 1/1985 |
| EP | 0 366 822 B1 | 11/1988 |
| EP | 0 478 526 A1 | 4/1992 |
| EP | 0 649 598 A1 | 4/1995 |
| EP | 0 754 408 A2 | 1/1997 |
| EP | 0 850 566 A1 | 7/1998 |
| EP | 0 983 724 A1 | 3/2000 |
| JP | 63-14656 | 1/1988 |
| JP | Sho. 63-14656 | 1/1988 |
| JP | 03-262462 | 11/1991 |
| JP | 07-107941 | 4/1995 |
| JP | 95095915 | 10/1995 |
| RU | SU 875660 A | 8/1983 |
| RU | SU 1090-316 A | 5/1984 |
| RU | 2084184 C1 | 7/1997 |
| WO | 85/03621 | 8/1985 |
| WO | 99/21438 | 5/1999 |
| WO | 99/65338 | 12/1999 |

OTHER PUBLICATIONS

"Tandoori" Chicken Breast Fillet Product Specification for Milchhof–Eiscreme GmbH and Co. KG dated Mar. 1995 and Sep. 1994 (English translation included).
Extract re "Tandoori Chicken Breast Fillet From Eismann–Catalogue 1995, p. 77" (English translation included).
Information taken from a bag for the "Tandoori" chicken breast fillet sold by Eismann.
Information taken from a label attached to an Eismann carton containing "Tandoori" chicken breast fillets.
Minutes of the Argevet Joint Panel on Oct. 12, 1990 at Berlin (English translation included).
Extract from Rompp–Lexikon Lebensmittelchemie Thieme 1995, pp. 429–430 (English translation included).
BS Walters et al: "Blood and pink color defect in poultry muscle", Dissertation Abstracts International, B; vol. 54 (10) 4980–4981 order No. DA9332703.
B Bater et al.: "Quality characteristics of hydrocolloid–added oven–roasted turkey breast", Journal of Food Science; vol. 57 (5), pp 1068–1070, 1992.
EP 1 024 710 (Notice of Opposition), Mar. 20, 2002 (with English translation).
Lebensmittel Report, Sep. 1998 (with English translation).
Lebensmittel Praxis Nr. 002 vom Mar. 27, 1998, Seite 060 (Datenbankausdruck) (with English translation).
Lebensmittel Praxis Nr. 011 vorn Jun. 5, 1998, Seite 040 (Datenbankausdruck) (with English translation).
Buch: "Technologie der Brühwurst", Bundesanstalt fur Fleischforchung, Kulmbacher Reihe Band 4, 1984, Seiten 60 bis 73 (with English translation).
EP 1 024 710 (Notice of Opposition), Mar. 20, 2002.
Lebensmittel Report, Sep. 1998.
Lebensmittel Praxis Nr. 002 vom Mar. 27, 1998, Seite 60 (Datenbankausdruck).
Lebensmittel Praxis Nr. 011 vom Jun. 5, 1998, Seite 040 (Datenbankausdruck).
Buch: "Technologie der Bruhwurst", Bundesanstalt fur Fleischforchung, Kulmbacher Reihe Band 4, 1984, Seiten 60 bis 73.

(List continued on next page.)

Primary Examiner—Arthur L. Corbin
(74) Attorney, Agent, or Firm—RatnerPrestia

(57) ABSTRACT

A cooked sausage is provided comprising a mixture of a meat emulsion and a fermented milk product preferably having a pH of 4.6 or more. The fermented milk product is substantially homogeneously dispersed through the meat emulsion and the mixture has a pH of about 5.5 or more.

47 Claims, 2 Drawing Sheets

OTHER PUBLICATIONS

Article "Protein–Enriched Milk and Milk Products" of Solms–Baruth, Published in Deutsche Milchwirtschaft, 48/1972, pp. 2057 to 2063.

The book "Technology of Preparing Boiling Sausage", 1984 published by Institute for Technology Federal Institute for Meat Research, pp. 70/71.

* cited by examiner

COOKED SAUSAGE AND METHOD FOR MAKING THE SAME

This application is a continuation-in-part application of PCT/GB98/02999 filed on Oct. 7, 1998.

FIELD OF THE INVENTION

The present invention relates to a novel cooked sausage and to a method for making the same. In particular, the invention relates to a cooked sausage comprising meat and a fermented milk product.

BACKGROUND TO THE INVENTION

At the time of writing, there is a general consumer demand for meat and sausage products that are easier to digest and contain fewer calories than traditional meat sausages. Previous attempts have been made to meet this demand by providing reduced fat sausages which are widely perceived by consumers to be healthier than the traditional variety. To this end, sausages have been produced using meat that is as lean as possible. Poultry meat, for example, has been used increasingly in the production of sausages and other consumer meat products.

EP-A-0029503 (Stauffer Chemical Company Limited) discloses an improved fermented sausage which comprises meat and a cultured dairy product. The cultured dairy product, which is preferably derived from whey and used dry, is cultured using traditional yogurt starter cultures comprising *L. Bulgaricus* and *S. Thermophilus* until a final pH in the range of 4.2 to 4.3 is reached. On admixing the dairy product to a meat emulsion, a final product pH in the range of 4.5 to 4.8 is achieved, without requiring any further fermentation of the meat product. After stuffing, the sausage is ripened, dried and/or smoked as required.

EP-A-0478526 (Vleeswarenfabrieken Imperial Naamloze Vennootschap) discloses a meat product, for example a sausage, comprising meat and a dairy product, preferably curdled bactofugated milk, eg melted cheese or curd. EP-A-0478526 discloses that the dairy product is prepared by curdling the bactofugated milk using traditional cheese coagulating agents, such as rennet ferment or other proteolytic enzymes from vegetable or microbial origin. The dairy product, on addition to the meat, has a pH in the range of 5.0 to 5.6. The mixture is then fermented further until a final pH of 4.6 to 5.2 is reached.

OBJECTS OF THE INVENTION

An object of the present invention is to provide a novel meat product. In particular, it is an object of the present invention to provide a novel cooked sausage.

Another object of the present invention is to provide a cooked sausage that will be perceived by consumers to be healthy to eat, and which comprises fewer calories than traditional meat sausages.

Yet another object of the present invention is to provide an improved cooked sausage comprising meat and a fermented dairy product.

SUMMARY OF THE INVENTION

According to one aspect of the present invention there is provided a cooked sausage comprising a mixture of a meat emulsion and a fermented milk product having a pH of at least about 4.6, wherein said fermented milk product is substantially homogeneously dispersed throughout the meat emulsion and said mixture has a pH of about 5.5 or more.

In a different aspect of the present invention, there is provided a method of making a cooked sausage which comprises forming a mixture of a meat emulsion and a fermented milk product having a pH of at least about 4.6, in which mixture said fermented milk product is substantially homogeneously dispersed through the emulsion, forming the mixture into a sausage, and thereafter cooking the sausage; wherein the pH and proportion of the fermented milk product in the mixture is such that the pH of the mixture is 5.5 or more.

Said fermented milk product may comprise one or more products selected from mild yogurt, buttermilk, soured cream milk, soured milk, fresh cheese, fermented whey and kefir.

The term "soured cream milk" as used herein includes soured cream, sauerrahm, schmand and creme fraiche.

The term "soured milk" includes sauermilch and dickmilch.

The term "fresh cheese" includes frischkäse, quark and cottage cheese.

Preferably the fermented milk product has a pH of about 4.8 or more, more preferably about 5.2 or more.

Said meat emulsion may comprise red meat such as, for example, as beef, lamb or pork, or poultry such, for example, as turkey or chicken. Such meat has a pH of about 6.0 to 6.2 and an isoelectric point of about pH 5.0 to about 5.2. In order to provide a boiled sausage that is juicy and has a desirable texture, it has been found that it is essential to keep the pH of the mixture of meat emulsion and fermented milk product at about pH 5.5 or more. If the pH of the mixture falls below pH 5.5 towards the isoelectric point of the meat, the water-retaining capacity of the meat is reduced, with the result that the juiciness and texture of the final product is impaired.

In a particularly preferred embodiment of the invention, said fermented milk product comprises mild yogurt. Normal yogurt has a pH of about 3.6 to 5.1, typically about 4.6. It will be appreciated therefore that if such a yogurt is mixed with a meat emulsion, the pH of the resultant mixture may have a pH less than 5.5. A mild yogurt in accordance with the present invention may comprise yogurt that is prepared in the traditional manner, but is used in the process of the invention before fermentation is fully completed. Thus, after inoculation of the milk mixture, the pH of the yogurt is monitored until it reaches the desired value. The mild yogurt is then made ready for use in the method of the present invention. In some embodiments, fermentation of the yogurt may be quenched by cooling the yogurt to a temperature in the range of −2 to 6° C., preferably 0 to 6° C. Preferably, the yogurt is cooled rapidly using liquid nitrogen or a plate-heat-exchanger.

In order to assist in controlling accurately the pH of the yogurt to be added to the meat emulsion, slow-working yogurt starter cultures are preferably used. Such slow working yogurt cultures may comprise *Lactobacillus acidophilus, Bifidobacteria* and *Streptococcus thermophilus*. Further, the yogurt is preferably stirred continuously before use to allow accurate pH control.

In accordance with the invention, buttermilk may be made from the residual milk that remains after conventional butter-churning, that is separation of the milk-fat (butter) from the remaining milk substances. Said residual milk may be soured using suitable, preferably slow-working, starter cultures such as *lactococcus lactis* subsp. *cremoris, lactococcus lactis* subsp. *lactis, Leuconostoc mesenteroides* subsp. *cremoris* and/or *lactococcus lactis* subsp. *diacetylactis* until a pH of about 4.8 or more is reached. Alternatively said buttermilk may be made by first souring whole milk to a desired pH with suitable starter cultures, and then quenching fermentation and churning to separate the buttermilk from the milk-fat (butter).

Said soured creamed milk in accordance with the invention may be made by souring whole milk with a high fat content using suitable starter cultures such as *lactococcus lactis* subsq. *cremoris, lactococcus lactis* subsp. *lactis* and/or *leuconostoc mesenteroides* subsq. *cremoris* to a desired pH of 4.8 or more.

Soured milk, including curd milk, may be made by fermenting whole milk having a normal fat content using starter cultures such, for example as *lactococcus lactis* subsq. *cremoris, lactococcus lactis* subsp. *lactis* and/or *leuconostoc mesenteroides* subsq. *cremoris*.

Said fresh cheese may be made in the conventional manner by fermenting whole milk using suitable cheese starter cultures such as *lactococcus lactis* subsq. *cremoris, lactococcus lactis* subsp. *lactis* and/or *leuconostoc mesenteroides* subsq. *cremoris* in the presence of a curdling enzyme such, for example, as rennet. Once the desired pH is reached, the fermentation may be quenched and the cheese allowed to set. Once the mass has set, the cheese may be crushed mechanically and the solid cheese component extracted from the remaining liquid whey. The consistency of the cheese may be adjusted as desired by centrifugation, straining and/or the addition of cream. For quark, starter cultures such as *lactobacillus acidophillus, lactococcus lactis* subsq. *cremoris, lactococcus lactis* subsq. *lactis leuconostoc mesenteroides* subsp. *cremoris bifidobacter* may be used.

The remaining whey may also be used in accordance with the present invention when it has a pH of 4.8 or more.

Where the fermented milk product of the present invention comprises two or more different components, it is not necessary that each component has an individual pH or 4.6 or more, only that the overall pH of the fermented milk product is 4.6 or more, preferably 4.8 or more, and in some embodiments 5.1 or more.

In some embodiments, said fermented milk product may comprise an edible, alkaline additive to neutralize the acidity of the product. Said alkaline additive may comprise, for example, carbonated soda and/or ammonium carbonate. Alkaline phosphates and/or citrates could also be used to stabilize the mixture.

In some embodiments, the fermented milk product may be used in dried or freeze-dried form.

Said mixture may comprise 60 to 90% by weight of said meat emulsion.

Said mixture may comprise 10 to 40% by weight of the fermented milk product, preferably 15 to 35% by weight. Typically, the mixture may comprise about 24 to 26% by weight of mild yogurt, e.g. 25% wt.

Said mixture may further comprise 0–10% by weight of various spices or other additives. In a particularly preferred embodiment of the invention, said mixture may comprise up to 10% of a pre-biotic additive such as a non-digestible carbohydrate. An example of a pre-biotic carbohydrate is inulin. Said mixture may comprise 2–7% wt inulin, which selectively promotes the activity of some health-promoting bacteria in the colon.

Said mixture of meat and fermented milk product may be formed into sausages in any suitable manner to those skilled in the art, including moulding and extrusion. Preferably, the meat/milk mixture is extruded through a stuffing horn into a flexible sausage casing of the kind well known to those skilled in the art. However, it is also envisaged that the boiled sausage in accordance with the present invention may be formed by moulding and then forming a skin in situ by treating the surface of the sausage with a suitable acid so as to cause coagulation of the surface layer of meat.

Said meat emulsion preferably comprises an emulsion of finely comminuted meat. Said meat emulsion may be formed by comminuting whole muscle, ground, minced or mechanically separated meat. The meat may be used fresh or frozen. Said meat is preferably finely comminuted in the presence of said yogurt to form an emulsion having a soft, homogeneous consistency. In some embodiments the emulsion may further comprise coarsely ground meat, which may be substantially uniformly dispersed through the emulsion.

Preferably, the fermented milk product is added to the meat during comminution in small portions or continuously, for example, with the aid of pumping equipment. It is preferable to ensure that the pH of the milk/meat mixture does not fall below about pH 5.5, even transiently, during mixing of the fermented milk with the meat. At the same time, it is preferable to ensure that the pH of the fermented milk product is not increased too much by the meat, such that the characteristic aroma of the fermented milk is lost particularly where yogurt is used.

An advantage of the present invention is that by adding a cooled, fermented milk product at a temperature of 0 to 6° C. to the meat emulsion, the normal addition of cooled water to meat emulsions for sausage manufacture can be reduced or dispensed with altogether. Such cooled water is normally added to maintain the temperature of the emulsion below about 12° C. during comminution and subsequent extrusion, and also to bind with the meat emulsion to cause the product to swell. Of course, some fermented milk products contain a substantial proportion of water, and in accordance with the present invention, this water can be used to replace the additional water that is normally added during sausage manufacture.

Preferably the meat is chilled prior to admixture of the fermented milk product to a temperature in the range 0 to 8° C.

Finally, the sausage is cooked. Said sausage may be boiled. By "boiled" here is meant heating the sausage in any suitable, edible fluid, preferably water, at a temperature and for a time sufficient to cook the meat. In some embodiments the sausage may be steamed. Preferably the sausage is boiled at a temperature in the range 60 to 80° C., more preferably in the range of 70 to 75° C., eg 72° C. Alternatively, the sausage may be cooked in hot air and/or hot smoke. Preferably, the sausage is cooked at a sufficient temperature to kill the fermentation cultures, so as to prevent further fermentation of the milk in the finished product.

Thus, the present invention provides a novel cooked sausage containing meat and a fermented milk product and also a method for manufacturing this product. The cooked sausage of the invention is relatively high in protein, but contains reduced fat as compared with a conventional meat sausage. The fermented milk product, particularly yogurt, adds a distinctive flavour and aroma to the product. The pH of yogurt when added to the meat emulsion is sufficient low that the yogurt has the characteristic flavour and aroma of normal yogurt, but is not so low as to reduce the pH of the meat/yogurt mixture below about pH 5.5, so that the emulsion retains its water binding properties to ensure that a sausage is produced that is desirably juicy and has attractive organoleptic quality.

Following is a description by way of example only with reference to the accompanying drawings of methods occurred in the present invention into effect.

DETAILED DESCRIPTION OF THE DRAWINGS

Figure 1A:
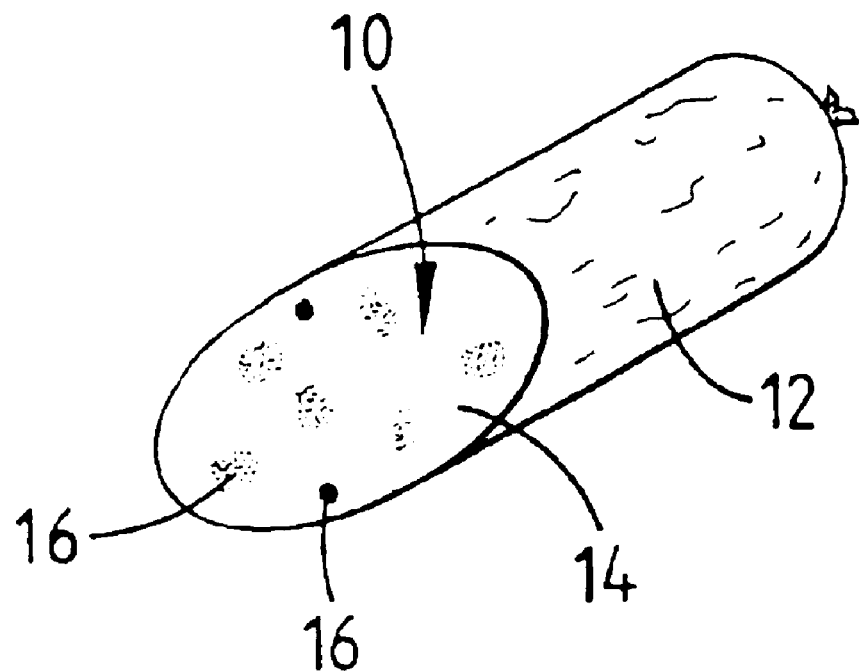
FIG. 1A is a schematic, isometric view of a cooked sausage in accordance with the present invention.
Figure 1B:
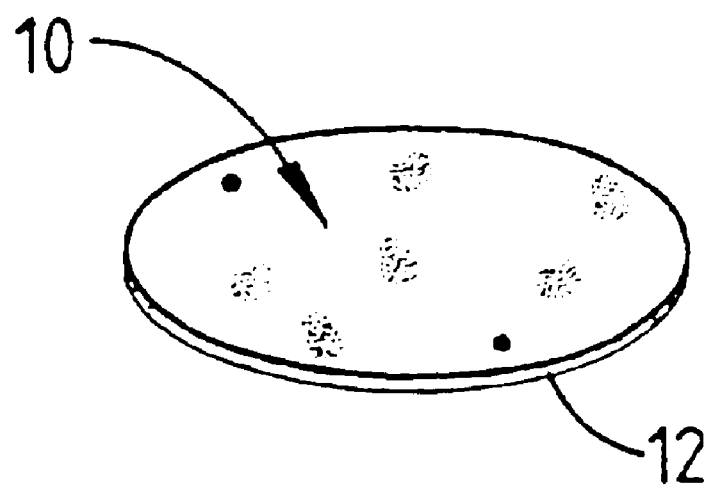
FIG. 1B is a schematic, isometric view of a slice of a cooked sausage in accordance with the present invention.

With reference to FIGS. 1A and 1B, a boiled sausage, such as a frankfurter, in accordance with the invention has a normal sausage shape and comprises an edible sausage material 10 that is stuffed into a conventional sausage casing 12. Said sausage material 10 comprises a finely comminuted meat emulsion 14 and a coarse component 16 that is substantially uniformly dispersed through the emulsion 14. Said coarse component comprises coarsely ground pieces of meat and optional seasonings such, for example, as whole or coarsely ground peppercorns. In some embodiments, the coarse portion may be omitted.

Said finely comminuted meat emulsion 14 comprises a mixture of meat and a fermented milk product which are substantially homogeneously blended together to form an emulsion. The meat pieces of the coarse component 16 may also be tumbled with a fermented milk product.

EXAMPLES

Example 1

A specific example of a turkey putenjagdwurst with yogurt is made according to the following recipe:

| Finely Comminuted Meat Emulsion | |
|---|---|
| Turkey thigh meat | 10.0% |
| Turkey white trim | 20.5% |
| Turkey dark trim | 20.5% |
| Chicken trim | 14.2% |
| Yogurt | 25.1% |
| Spices | 9.7% |
| | 100% |

| Dry Ingredients for Meat Emulsion | | |
|---|---|---|
| I. | Curing salt | 1.39% |
| | sodium citric | 0.56% |
| II. | Ground mustard seed | 0.8% |
| | lactose | 0.6% |
| III. | Super Pōlk | 0.25% |
| | (ascorbate, sugar) | |
| | Senator (spicemix Raps) | 0.57% |
| | Green Pepper (Raps) | 0.16% |
| | Glutalin (Raps) (flavourenhancer) | 0.19% |
| | HVP (hydrolysed vegetable protein) | 0.19% |
| IV. | Inulin (Frutafit) | 4.9% |
| V. | Liquid onion (Raps) | 0.09% |
| | liquid garlic (Raps) | 0.03% |

| Dry Ingredients for Meat Emulsion -continued | |
|---|---|
| Coarse Component | |
| Turkey thigh meat | 66.2% |
| Yogurt | 24.8% |
| Spices | 9.0% |
| | 100% |

The coarse component is ground through a 13 mm plate.

| Spices for Coarse Component | | |
|---|---|---|
| I. | Curing salt | 1.85% |
| | sodium citric | 0.56% |
| II. | Inulin (Frutafit) | 3.1% |
| III. | Super Pōlk | 0.12% |
| | (ascorbate, sugar) | |
| | Green Pepper (Raps) | 0.12% |
| | Glutalin (Raps) | 0.26% |
| IV. | Spice-mix | 0.70% |
| | Schinkenwurstgewürz | |
| | (Wolf) | |
| | Senator (Raps) | 0.44% |
| V. | Garlic, liquid (Raps) | 0.22% |
| | fresh onion, liquid | 0.27% |
| | (Raps) | |
| VI. | Green pepper corns | 1.35% |
| | | 8.99% |

Figure 2:
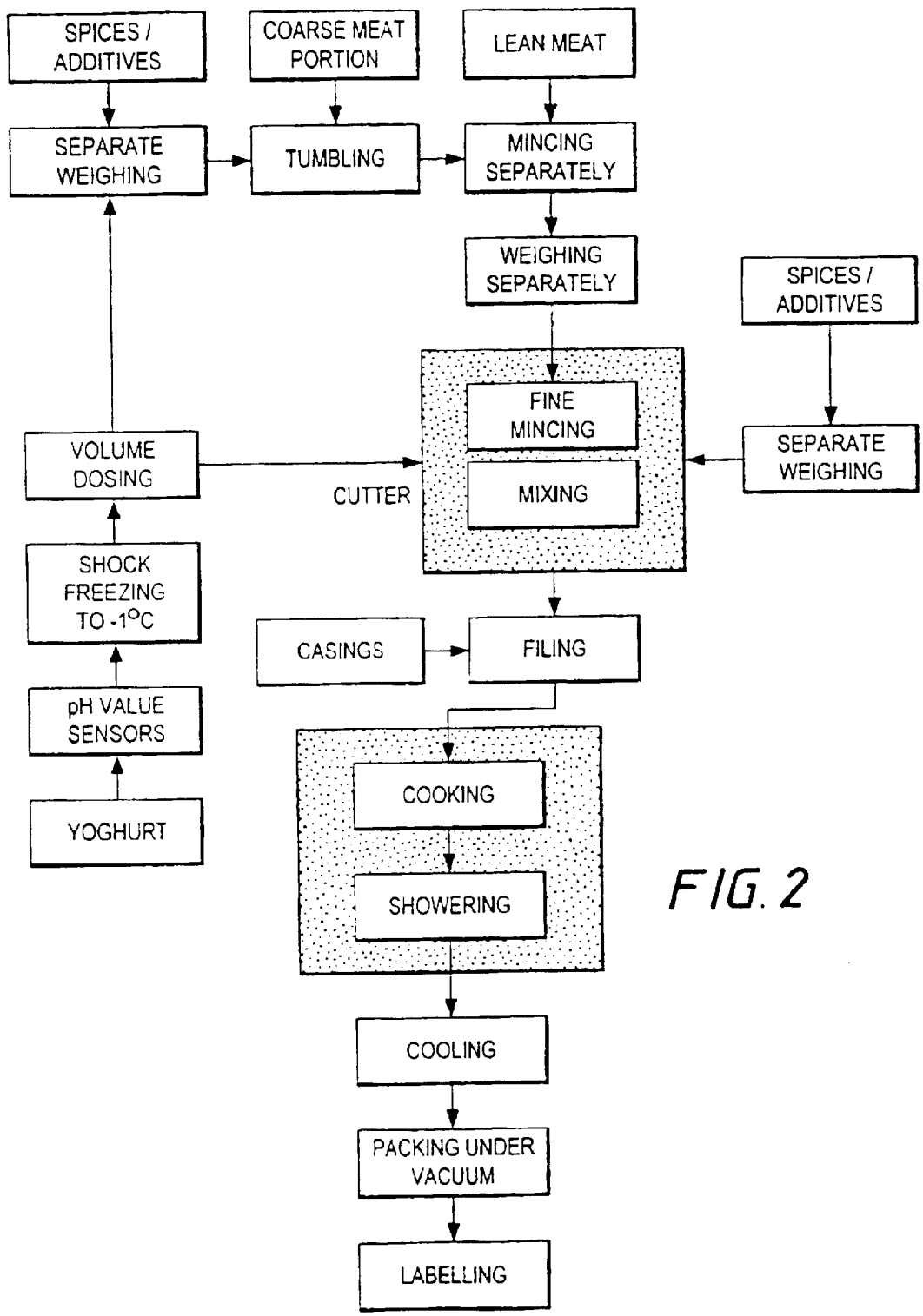
FIG. 2 shows a flow diagram for manufacturing a boiled sausage in accordance with the invention.

The yogurt for addition to the meat emulsion and coarse component is manufactured in the traditional way using milk that is clarified and separated into cream and skimmed milk, and then standardised to achieve a desired fat content. The desired proportions of cream and skimmed milk are then blended together, and the mixture is pasteurised and then homogenised. The homogenised mixture is cooled to a temperature in the range of about 30 to about 50° C. and then inoculated with a slow working yogurt starter culture comprising *Streptococcus thermophilus, Lactobacillus acidophilus* and *Bifidobacteria*. The mixture is then allowed to ferment for about four to six hours at 30 to 50° C., typically about 43° C., such that the mixture coagulates to form yogurt. As shown in FIG. 2, the pH of the mixture is carefully monitored. When the pH of the yogurt reaches a target pH of about 5.1 to 5.2, the yogurt is stirred to allow accurate determination of the pH. Such stirring also has the effect of an arresting fermentation. When a target pH of 4.8 or more is reached, the yogurt is subjected to shock freezing to a temperature of about −1° C. At this temperature, further fermentation of the yogurt is prevented. For such shock freezing, liquid nitrogen or a plate-heat-exchanger may be used.

In view of the need to control accurately the pH of the yogurt used in the process of the invention, it is desirable that the yogurt is made at the same site as sausage manufacture takes place, but it is envisaged that alternatively yogurt supplied from a nearby dairy may be used.

The chilled yogurt is then divided into two separate portions. A first portion is weighed for addition to the coarse component 16 of the sausage material 10. At the weighing stage, the additional spices and additives are added to the yogurt. Said coarse component is then tumbled with the yogurt for about two hours and is then ground. A second portion of the yogurt is added in small batches to minced meat having a temperature of about 0° C. Said minced meat is then finely comminuted with the yogurt to form an emulsion, and the yogurt assists in maintaining the temperature of the meat emulsion below about 12° C. The additional spices and additives are added to the meat emulsion during comminution.

43% Wt of the coarse component is then mixed with 57% wt of the comminuted meat emulsion, such that the coarse component is substantially uniformly dispersed throughout the finely comminuted meat emulsion. The mixture is then stuffed into sausage casings using a stuffing horn of the kind well know to those skilled in the art. The resulting sausages are boiled at a temperature of about 72° C. in the water and then showered, cooled, packed-and labelled in the conventional manner.

The total amount of yogurt added to the sausage material is calculated such that the overall pH of the sausage material does not fall below about pH 5.5. In this way, the sausage material retains its ability to the bind water, so that a desirable juicy product is produced. At the same time, the yogurt having a target pH of about 4.8 or more has an acceptable yogurt flavour and aroma.

Example 2

A specific example of a pork meat putenjagdwurst with yogurt is prepared using the method described above in Example 1 as follows:

| Finely Comminuted Meat Emulsion | |
|---|---|
| Lean pork trimmings | 32.1% |
| Pork shin meat | 20.5% |
| Pork neck fat | 15.2% |
| Yogurt | 25.1% |
| Spices | 7.1% |
| | 100% |

The emulsion is made in a bowl-chopper. Yogurt is added in small quantities.

| Dry Ingredients for Emulsion | | |
|---|---|---|
| I. Curing salt | | 1.39% |
| sodium citric | | 0.56% |
| II. Ground mustard seed | | 2.72% |
| lactose | | 0.9% |
| III. Super Pök | | 0.25% |
| (ascorbate, sugar) | | |
| Senator (Spicemix Raps) | | 0.56% |
| Green Pepper (Raps) | | 0.16% |
| glutalin (raps) (flavour enhancer) | | 0.19% |
| HVP (hydrolysed vegetable protein) | | 0.19% |
| IV. liquid onion (Raps) | | 0.09% |
| liquid garlic (Raps) | | 0.03% |
| | | 7.04% |
| Coarse Meat Component | | |
| Pork shoulder 90VL | | 67.9% |
| Yogurt | | 24.8% |
| Spices | | 7.3% |
| | | 100% |

The coarse component is ground through a 13 mm plate.

| Spices for Coarse Component | | |
|---|---|---|
| I. Curing salt | | 1.85% |
| sodium citric | | 0.56% |
| II. lactose | | 0.5% |
| ground mustard seed | | 0.98% |
| III. Super Pök | | 0.12% |
| (ascorbate, sugar) | | |
| Green Pepper (Raps) | | 0.12% |
| Glutalin (Raps) | | 0.26% |
| IV. Spicemix | | |
| Schinkenwurstgewürz | | 0.70% |
| (Wolf) | | |
| Senator (Raps) | | 0.44% |
| V. Garlic, liquid (Raps) | | 0.22% |
| fresh onion, liquid | | 0.27% |
| (Raps) | | |
| VI. Green pepper corns | | 1.35% |
| | | 7.30% |

At the final mixing stage, 57% by weight of the finely comminuted pork meat emulsion is mixed with 43% weight of the coarse meat portion.

Example 3

A frankfurter with cottage cheese and frischkäse is made according to the following recipe:

| Spices for Coarse Component | |
|---|---|
| Port trimmings SOVL | 40.0% |
| Turkey white trim | 10.0% |
| Chicken trim | 5.0% |
| Water/ice | 8.45% |
| Cottage cheese, pH = 4.7 | 20.0% |
| Fresh cheese, pH = 4.8–4.9 | 10.0% |
| Spices | 6.55% |
| | 100% |
| Spice mix for meat emulsion | |
| Curing salt | 1.5% |
| Sodium citrate | 0.8% |
| Lactose | 1.2% |
| Ground mustard seed | 1.2% |
| Sodium ascorbate | 0.05% |
| Matador (Spice mix Raps) | 1.1% |
| Hydrolysed vegetable protein | 0.3% |
| Liquid onion | 0.2% |
| Liquid garlic | 0.2% |
| | 6.55% |

The cottage cheese and fresh cheese are made by conventional processes comprising fermenting milk using a cheese soured culture in the presence of a curdling enzyme such, for example, as rennet. As starter cultures may be used *lactococcus lactis* subsp. *cremoris, lactococcus lactis* subsp. *lactis* and/or *leuconostoc mesenteroides* subsp. *cremoris*. As with the milk yogurt of Examples 1 and 2 above, the pH of the cheese is monitored as fermentation proceeds until the desired, final pH is reached, when fermentation is arrested. Once the cheese has set, it is mechanically crushed, and the solid cheese component is separated from the whey residue. The consistency of the cheese can be adjusted by centrifuging, straining and/or the addition of cream.

The cheese is then mixed with the other ingredients at a temperature of about 0° C. and finely comminuted in a bowl chopper to form an emulsion. The emulsion is then stuffed into shirred sausage casings using a stuffing horn, and the resulting frankfurters are boiled in water at a temperature of about 72° C., showered, cooled, packed and labelled.

What is claimed is:

1. A cooked sausage comprising a mixture of a meat emulsion and a fermented milk product having a pH of 4.6 or more, wherein said fermented milk product is substantially homogeneously dispersed through the meat emulsion and said mixture has a pH of about 5.5 or more, and wherein said mixture comprises 15 to 40% by weight of the fermented milk product.

2. A cooked sausage as claimed in claim 1, wherein said fermented milk product has a pH of 4.8 or more.

3. A cooked sausage as claimed in claim 1, wherein said fermented milk product has a pH of 5.2 or more.

4. A cooked sausage as claimed in claim 1, wherein said fermented milk product is selected from one of more of mild yogurt, buttermilk, soured cream milk, soured milk, fresh cheese, fermented whey and kefir.

5. A cooked sausage as claimed in claim 1, wherein said mixture comprises 60 to 90% by wt of said meat emulsion.

6. A cooked sausage as claimed in claim 1, wherein said mixture further comprises up to 10% by weight of various spices.

7. A cooked sausage as claimed in claim 1, wherein said meat emulsion comprises red meat or poultry.

8. A cooked sausage as claimed in claim 1, said milk product comprising an edible, alkaline additive to neutralize the acidity thereof.

9. A cooked sausage as claimed in claim 1, wherein said mixture comprises 15 to 35% by weight of the fermented milk product.

10. A cooked sausage comprising a mixture of a meat emulsion and a fermented milk product having a pH of 4.6 or more, wherein said fermented milk product is substantially homogeneously dispersed through the meat emulsion and said mixture has a pH of about 5.5 or more, wherein said mixture comprises 10 to 40% by weight of the fermented milk product, and wherein said mixture comprises up to 10% by wt of a prebiotic additive.

11. A cooked sausage as claimed in claim 10, wherein said prebiotic additive is inulin.

12. A method of making a cooked sausage which comprises forming a mixture of a meat emulsion and a fermented milk product having a pH of 4.6 or more, in which mixture said fermented milk product is substantially homogeneously dispersed through the emulsion, forming the mixture into a sausage, and thereafter cooking the sausage; wherein the pH and proportion of the fermented milk product in the mixture is such that the pH of the mixture is 5.5 or more, wherein said mixture comprises 15 to 40% by weight of the fermented milk product.

13. A method as claimed in claim 12 wherein said fermented milk product has a pH of 4.8 or more.

14. A method as claimed in claim 12 wherein said fermented milk product has a pH of 5.2 or more.

15. A method as claimed in claim 12, wherein said fermented milk product is prepared by inoculating a milk product with a starter culture, monitoring the pH of the fermented milk product, and quenching fermentation of the fermented milk product when the pH reaches a desired value.

16. A method as claimed in claim 15, wherein fermentation of the milk product is quenched by cooling the fermented milk product to a temperature in the range −2 to 6° C.

17. A method as claimed in claim 15, wherein said starter culture comprises a slow working starter culture.

18. A method as claimed in claim 12, wherein the mixture of meat and fermented milk product is formed into a sausage by extrusion through a stuffing horn into a flexible casing.

19. A method as claimed in claim 12, wherein said meat emulsion comprises an emulsion of finely comminuted meat and is formed by comminuting whole muscle, ground, minced or mechanically separated meat in the presence of said fermented milk product.

20. A method as claimed in claim 19, wherein said fermented milk product is added to the meat at a temperature of 0 to 6° C.

21. A method as claimed in claim 19, wherein said meat has a temperature prior to comminution of 0 to 8° C.

22. A method as claimed in claim 12, wherein the sausage is cooked by heating in an edible fluid.

23. A method as claimed in claim 12, wherein the sausage is cooked by boiling in water at a temperature in the range 60 to 80° C.

24. A method as claimed in claim 12, wherein said sausage is cooked in hot air and/or hot smoke.

25. A cooked sausage as claimed in claim 12 said milk product comprising an edible, alkaline additive to neutralize the acidity thereof.

26. A method as claimed in claim 12, wherein said mixture comprises 15 to 35% by weight of the fermented milk product.

27. A cooked sausage comprising a mixture of a meat emulsion and a mild yogurt, wherein said mild yogurt is substantially homogeneously dispersed through the meat emulsion and said mixture has a pH of about 5.5 or more, and wherein said mixture comprises 15 to 40% by weight of the mild yogurt, and wherein said mild yogurt has a pH of 4.8 or more.

28. A cooked sausage as claimed in claim 27, wherein said mixture comprises 60 to 90% by wt of said meat emulsion.

29. A cooked sausage as claimed in claim 27, wherein said mixture further comprises up to 10% by weight of various spices.

30. A cooked sausage as claimed in claim 27, wherein said meat emulsion comprises red meat or poultry.

31. A cooked sausage as claimed in claim 27, said mild yogurt comprising an edible, alkaline additive to neutralize the acidity thereof.

32. A cooked sausage as claimed in claim 27, wherein said mixture comprises 15 to 35% by weight of the mild yogurt.

33. A cooked sausage comprising a mixture of a meat emulsion and a mild yogurt, wherein said mild yogurt is substantially homogeneously dispersed through the meat emulsion and said mixture has a pH of about 5.5 or more, wherein said mixture comprises 10 to 40% by weight of the mild yogurt, wherein said mild yogurt has a pH of 4.8 or more, and wherein said mixture comprises up to 10% by wt of a prebiotic additive.

34. A cooked sausage as claimed in claim 33, wherein said prebiotic additive is inulin.

35. A method of making a cooked sausage which comprises forming a mixture of a meat emulsion and mild yogurt, in which mixture said yogurt is substantially homogeneously dispersed through the emulsion, forming the mixture into a sausage, and thereafter cooking the sausage; wherein the pH and proportion of the mild yogurt in the mixture is such that the pH of the mixture is 5.5 or more, and wherein said mixture comprises 15 to 40% by weight of the mild yogurt, wherein said mild yogurt has a pH of 4.8 or more.

36. A method as claimed in claim 35, wherein said mild yogurt is prepared by inoculating a milk mixture with a yogurt starter culture, monitoring the pH of the yogurt, and quenching fermentation of the yogurt when the pH reaches a desired value.

37. A method as claimed in claim 36, wherein fermentation of the yogurt is quenched by cooling the yogurt to a temperature in the range −2 to 6° C.

38. A method as claimed in claim 36, wherein said yogurt starter culture comprises a slow working yogurt culture.

39. A method as claimed in claim 35, wherein the mixture of meat and yogurt is formed into a sausage by extrusion through a stuffing horn into a flexible casing.

40. A method as claimed in claim 35, wherein said meat emulsion comprises an emulsion of finely comminuted meat and is formed by comminuting whole muscle, ground, minced or mechanically separated meat in the presence of said yogurt.

41. A method as claimed in claim 40, wherein said yogurt is added to the meat at a temperature of 0 to 6° C.

42. A method as claimed in claim 40, wherein said meat has a temperature prior to comminution of 0 to 8° C.

43. A method as claimed in claim 35, wherein the sausage is cooked by heating in an edible fluid.

44. A method as claimed in claim 35, wherein the sausage is cooked by boiling in water at a temperature in the range 60 to 80° C.

45. A method as claimed in claim 35, wherein said sausage is cooked in hot air and/or hot smoke.

46. A cooked sausage as claimed in claim 35, said mild yogurt comprising an edible, alkaline additive to neutralize the acidity thereof.

47. A method as claimed in claim 35, wherein said mixture comprises 15 to 35% by weight of the mild yogurt.

* * * * *